US006954828B2

(12) United States Patent
Devereux

(10) Patent No.: US 6,954,828 B2
(45) Date of Patent: Oct. 11, 2005

(54) MANAGEMENT OF CACHES IN A DATA PROCESSING APPARATUS

(75) Inventor: Ian Victor Devereux, Fulbourn (GB)

(73) Assignee: ARM Limited, Cambridge (GB)

( * ) Notice: Subject to any disclaimer, the term of this patent is extended or adjusted under 35 U.S.C. 154(b) by 221 days.

(21) Appl. No.: 10/635,684

(22) Filed: Aug. 7, 2003

(65) Prior Publication Data

US 2004/0030836 A1 Feb. 12, 2004

Related U.S. Application Data

(63) Continuation of application No. 09/956,238, filed on Sep. 20, 2001, now Pat. No. 6,671,779.

(30) Foreign Application Priority Data

Oct. 17, 2000 (GB) .............................. 0025468

(51) Int. Cl.[7] .............................................. G06F 12/00
(52) U.S. Cl. ....................... 711/128; 711/144; 711/145; 365/49
(58) Field of Search ........................... 365/49; 711/118, 711/128, 144, 145, 152, 163

(56) References Cited

U.S. PATENT DOCUMENTS

| | | | |
|---|---|---|---|
| 5,487,162 A | 1/1996 | Tanaka et al. | |
| 5,493,667 A | 2/1996 | Huck et al. | 711/125 |
| 5,511,178 A | 4/1996 | Takeda et al. | 711/125 |
| 5,574,922 A | 11/1996 | James | 712/220 |
| 5,761,659 A | * 6/1998 | Bertoni | 707/8 |
| 5,913,224 A | 6/1999 | MacDonald | 711/125 |
| 6,047,358 A | 4/2000 | Jacobs | |
| 6,092,159 A | 7/2000 | Ekner et al. | |
| 6,286,082 B1 | 9/2001 | Moudgal et al. | 711/143 |
| 6,412,043 B1 | 6/2002 | Chopra et al. | 711/118 |
| 6,430,655 B1 | 8/2002 | Courtright et al. | 711/118 |
| 6,438,655 B1 | 8/2002 | Nicol et al. | 711/136 |
| 6,483,516 B1 | 11/2002 | Tischler | 345/552 |
| 2001/0049771 A1 | 12/2001 | Tischler et al. | 711/133 |

FOREIGN PATENT DOCUMENTS

EP  0 687 979  12/1995

* cited by examiner

Primary Examiner—Donald Sparks
Assistant Examiner—Christain P. Chace
(74) Attorney, Agent, or Firm—Nixon & Vanderhye P.C.

(57) ABSTRACT

The present invention relates to the management of caches in a data processing apparatus, and in particular to the management of caches of the type where data in the cache may be designated as locked to prevent that data from being overwritten. The data processing apparatus comprises a processor, an n-way set associative cache having a plurality of entries, each entry being arranged to store one or more data values and a corresponding address identifier, the processor being operable to select one or more of the n-ways to operate in a lockdown mode, the lockdown mode being used to lock data values into the corresponding way, and a plurality of lockdown controllers. Each lockdown controller is associated with a corresponding way and comprises an address register arranged to store an address range specified by the processor such that, when the corresponding way is in the lockdown mode, only data values whose address identifiers are within the address range are locked into the corresponding way. This technique provides for reduced complexity during lockdown because in preferred embodiments a dedicated lockdown program is not required to carefully manage the storage of data values in the lockdown, the lockdown occurs automatically.

9 Claims, 7 Drawing Sheets

MANAGEMENT OF CACHES IN A DATA PROCESSING APPARATUS

This application is a Continuation of application Ser. No. 09/956,238, filed Sep. 20, 2001, now U.S. Pat. No. 6,671, 779 the entire content of which is hereby incorporated by reference in this application.

BACKGROUND OF THE INVENTION

1. Field of the Invention

The present invention relates to the management of caches in a data processing apparatus, and in particular to the management of caches of the type where data in the cache may be designated as locked to prevent that data from being overwritten.

2. Description of the Prior Art

A cache may be arranged to store data and/or instructions fetched from a memory so that they are subsequently readily accessible by a processor. Hereafter, the term "data value" will be used to refer to both instructions and data. The cache will store the data value until it is overwritten by a data value for a new location required by the processor. The data value is stored in cache using either physical or virtual memory locations. Should the data value in the cache have been altered then it is usual to ensure that the altered data value is re-written to the memory, either at the time the data is altered or when the data value in the cache is overwritten.

A number of different configurations have been developed for organising the contents of a cache. One such configuration is the so-called high associative cache. In an example 16 Kbyte high associative cache such as the 64-way set associative cache 30 illustrated in FIG. 1A, each of the 64 ways 110 contains a number of cache lines 130. Data values associated with a particular virtual address can be stored in a particular cache line of any of the 64 ways 110 (i.e. there are 64 choices of location for that data value within the cache 30). Each such group of 64 cache lines is referred to as a set. Each way 110 stores 256 bytes (16 Kbyte cache/64 ways). If each cache line stores eight 32-bit words then there are 32 bytes/cache line (8 words×4 bytes/word) and 8 cache lines in each way ((256 bytes/way)/(32 bytes/cache line)).

Another such configuration is the so-called low associative cache. In an example 16 Kbyte low associative cache such as the 4-way set associative cache 30' illustrated in FIG. 1B, each of the 4 ways 140, 142, 144, 146 contain a number of cache lines 130. Data values associated with a particular virtual address can be stored in a particular cache line of any of the 4 ways (i.e. each set has 4 cache lines). Each way stores 4 Kbytes (16 Kbyte cache/4 ways). If each cache line stores eight 32-bit words then there are 32 bytes/cache line (8 words×4 bytes/word) and 128 cache lines in each way ((4 Kbytes/way)/(32 bytes/cache line)).

A data value stored in the cache may be overwritten to allow a data value for a new location requested by the processor to be stored. If the data value overwritten is then required for a subsequent operation it must be re-fetched from the main memory which may take a number of clock cycles. Hence, when it is known that certain data values stored in the cache will be required for a future operation it is useful to designate those data values stored in the cache as locked to prevent those data values from being overwritten, this technique often being referred to as "lockdown". By locking the data value it is possible to ensure that the data value will be in the cache when it is required, which provides, for example, predictability of access times for real-time code.

FIG. 2 illustrates one such lockdown technique of the 4-way set associative cache 30' described above which utilises a cache controller 20. The cache controller 20 selects one of the four ways 140, 142, 144, 146 in the cache 30' to store the fetched data value. Typically, when storing data values in the cache, a so-called "linefill" technique is used whereby a complete cache line of, for example, 8 words (32 bytes) will be fetched and stored. The cache controller 20 comprises a locked way register 22 and force bit flag 24. The locked way register 22 determines the number of ways 140, 142, 144, 146 that are used to store locked data. If data values are to be locked in the cache, the force bit flag 24 is set, whereas if data values are not to be locked in the cache, the force bit flag 24 is reset.

When a data value is to be stored in the cache 30', the cache controller 20 will determine the status of the locked way register 22 and force bit flag 24. If the force bit flag 24 is not set then cache controller 20 will select one of the unlocked ways and the data value is stored in a suitable location in the unlocked way.

However, when lockdown is required the locked way register 22 is set to select the way to be locked and the force bit flag 24 is set. Now that the force bit flag 24 is set the cache controller 20 selects the locked way in dependence on the contents of the locked way register 22 and the data value is stored in a suitable location within the locked way. For example, assuming the locked way register 22 contains a value "0", line fills of locked data values will occur in way 0. Once lockdown is complete, the locked way register is incremented, in this example to contain a value "1", and the force bit flag 24 is reset. Data values stored in way 0 are now locked. Any further data values to be stored will be placed in ways 1 to 3. Should further data values need to be locked in the cache, the force bit flag 24 is set and line fills of locked data values will then occur in way 1. Again, once lockdown is complete, the locked way register is incremented, in this example to contain a value "2", and the force bit flag 24 is reset. Data values stored in way 0 and way 1 are now locked.

As described above, should data values need to be stored in an unlocked way, the cache controller 20 will select one of the remaining unlocked ways for fetched data to be stored thereafter. Hence, lockdown is achieved and the locked data values cannot be overwritten without the force bit flag 24 being set.

Whilst the lockdown technique described above allows lockdown, this approach has a number of disadvantages.

Firstly, it is clear that this technique is not very flexible as during lockdown sequential ways are filled with locked data values and hence, for example, if way 1 contains locked data values, way 0 cannot be arranged to store unlocked data values without way 1 also being so arranged.

Secondly, the lockdown technique requires a dedicated lockdown program to carefully manage the storage of data values in the lockdown way to ensure that parts of the lockdown program do not get locked in the lockdown way along with the data. Having the lockdown program or parts thereof occupying the lockdown way is clearly undesirable as this will result in incorrect operation of the lockdown process. Hence, the lockdown program will either need to be written such that it resides in an area of so-called "uncacheable" memory such that the lockdown program does not get locked in the cache, or will have to be pre-loaded into another cache way prior to performing the lockdown process. Furthermore, when the dedicated program is forced to operate from memory, its operation is comparatively slow.

Hence, there is a need to provide an improved lockdown technique.

SUMMARY OF THE INVENTION

According to a first aspect of the present invention there is provided a data processing apparatus comprising a processor, an n-way set associative cache having a plurality of entries, each entry being arranged to store one or more data values and a corresponding address identifier, the processor being operable to select one or more of the n-ways to operate in a lockdown mode, the lockdown mode being used to lock data values into the corresponding way, and a plurality of lockdown controllers, each lockdown controller being associated with a corresponding way, each lockdown controller comprising an address register arranged to store an address range specified by the processor such that, when the corresponding way is in the lockdown mode, only data values whose address identifiers are within the address range are locked into the corresponding way.

In accordance with embodiments of the present invention, only data values whose addresses identifiers fall within the address range specified by the processor will be locked by the lockdown controller into the corresponding way during the lockdown mode.

This technique provides for reduced complexity during lockdown because in preferred embodiments a dedicated lockdown program is not required to carefully manage the storage of locked data values in the cache, and instead locking of data values can occur automatically. In an n-way set associative cache memory of preferred embodiments, one or more of the lockdown controllers may receive an address range for use in a lockdown mode. When a data value to be cached is received, the cache selects one of the available ways to store the data value. When lockdown is required, the processor will instruct the lockdown controller associated with a corresponding way to enter the lockdown mode. Thereafter, data values whose address identifier is within the address range of the lockdown controller will be stored and locked down in the corresponding way. Should the address identifier not fall within the address range of the lockdown controller then the data values will be stored in one of the other ways.

However, if a lockdown program is still used in embodiments of the present invention, then the restrictions placed upon the programmer when writing the program are reduced as he need not be concerned that the program will accidentally be locked in the lockdown way of the cache. All the programmer need do is to ensure that the address identifiers of the lockdown program instructions and data do not fall within the address range specified to the lockdown controller. By this simple measure, it can be ensured that the data values of the lockdown program will not occupy the lockdown way and prevent the correct operation of the lockdown program. In particular, there is no requirement that the lockdown program be written such that it resides in an area of so-called "uncacheable" memory, or be pre-loaded into another cache way prior to performing the lockdown process.

This technique also provides for increased flexibility since a lockdown controller may store an address range for lockdown, but lockdown is only initiated when the processor selects the lockdown mode. Hence, lockdown may be initiated or terminated as and when required.

Preferably, each lockdown controller further comprises a mode indicator for identifying when the lockdown mode has been selected for the corresponding way.

In preferred embodiments, the mode indicator provides information about the mode selected for the corresponding way, since each way may preferably operate in a number of different modes. In preferred embodiments, the mode indicator will, therefore, enable a determination to be made as to whether the corresponding way is available to store all data values, unavailable to store any data values or only available to store locked data values.

Preferably, the mode indicator comprises an enable lockdown flag, the lockdown mode being selected when the enable lockdown flag is set by the processor.

In preferred embodiments, when the enable lockdown flag is set, data values whose address identifier is within the address range will be locked into the corresponding way. When the lockdown flag is not set, the lockdown controller will generally operate in an unlocked mode where any data values may be stored in the corresponding way.

Optionally, the mode indicator further comprises a disable unlocked allocation flag, the corresponding way being prevented from storing any unlocked data values when the disable unlocked allocation flag is set.

Hence, when the disable unlocked allocation flag is not set, the corresponding way may be available to store any data values. However, when the disable unlocked allocation flag is set, the corresponding way is prevented from storing any further unlocked data values.

In embodiments which include both the enable lockdown flag and the disable unlocked allocation flag the following modes can occur in the corresponding way: any data values to be stored (enable lockdown flag not set, disable unlocked allocation flag not set); no data values to be stored (enable lockdown flag not set, disable unlocked allocation flag set); only locked data values to be stored (enable lockdown flag set, disable unlocked allocation flag set).

Preferably, the number of addresses in the address range equals the number of entries in the corresponding way.

Hence, the entire selected way may be utilised and completely filled with locked data.

Alternatively, the number of addresses in the address range is less than the number of entries in the corresponding way.

Hence, a narrower range of addresses may be locked into part of the selected way.

It will be appreciated by the skilled person that with the above technique a complete way must be designated as locked, thus reducing the size of the available cache. Whilst this may not be particularly problematic for a high associative cache, for a low associative cache, such as that described above, a significant amount of the cache becomes unusable (e.g. a quarter in the FIG. 1B example).

Preferably, therefore, the cache further comprises a lockdown field for each entry which is set to indicate that the one or more data values in that entry are locked.

Hence, each data value may be individually designated as locked, and because the lockdown field is set, the cache will not overwrite the locked data values with unlocked data values. Accordingly, in such preferred embodiments, there is no need to set the disable unlocked allocation flag, since each locked data value is marked as such by the setting of the corresponding lockdown field, and so cannot be overwritten by any unlocked data placed in that way. Once the desired data values have been locked in the corresponding way, the enable lockdown flag may be cleared to prevent further data values which fall within the address range from overwriting the locked data.

This approach allows locked and unlocked data values to share the same way of a cache which helps improve cache utilisation. Because a complete way need not be designated as locked this increases the size of the available cache for unlocked data values. This approach is particularly advantageous for low associative caches, where each way is a significant proportion of the overall cache.

Preferably, each data value comprises a cache line and the lockdown field comprises one bit.

Hence, a complete cache line may be designated as locked by simply utilising one bit.

Viewed from a second aspect, the present invention provides a lockdown controller for a data processing apparatus in accordance with the first aspect of the present invention, the lockdown controller comprising an address register arranged to store an address range specified by the processor such that, when the corresponding way is in the lockdown mode, only data values whose address identifiers are within the address range are locked into the corresponding way.

According to another aspect of the present invention there is provided a method of locking data values in a way of an n-way set associative cache, the cache having a plurality of entries, each entry being arranged to store one or more data values and a corresponding address identifier, the method comprising the steps of a) selecting a way to operate in a lockdown mode, b) storing an address range specified by a processor in an address register of a lockdown controller associated with the way selected at step (a), and c) upon receipt of a data value at the cache, locking the data value in the way selected at step (a) if the corresponding address identifier is within the address range.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figures 1A, 1B:
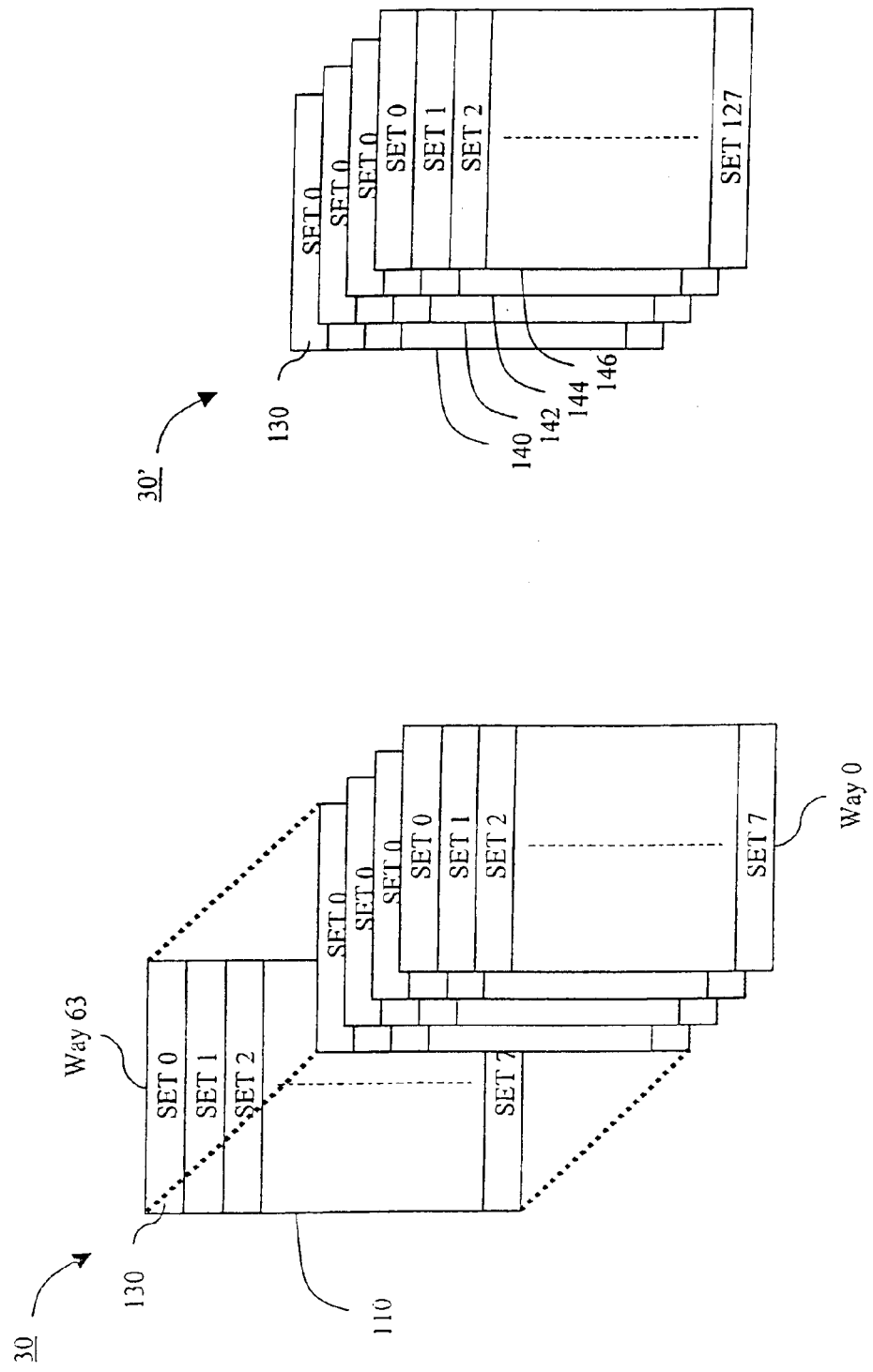
FIG. 1A is a schematic representation of a high associative cache.
FIG. 1B is a schematic representation of a low associative cache.
Figure 2:
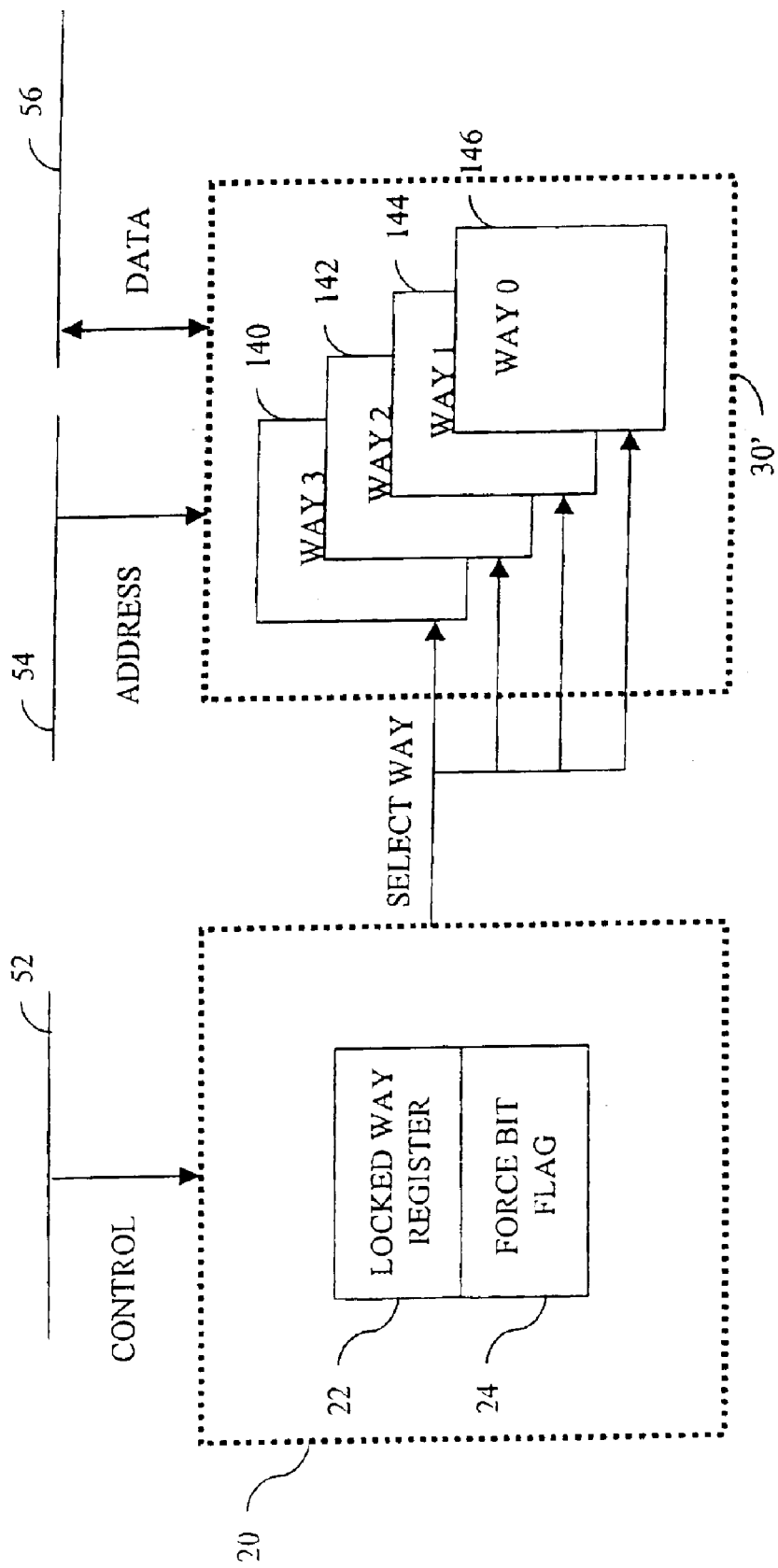
FIG. 2 is a block diagram illustrating a prior art approach to lockdown.
Figure 3:
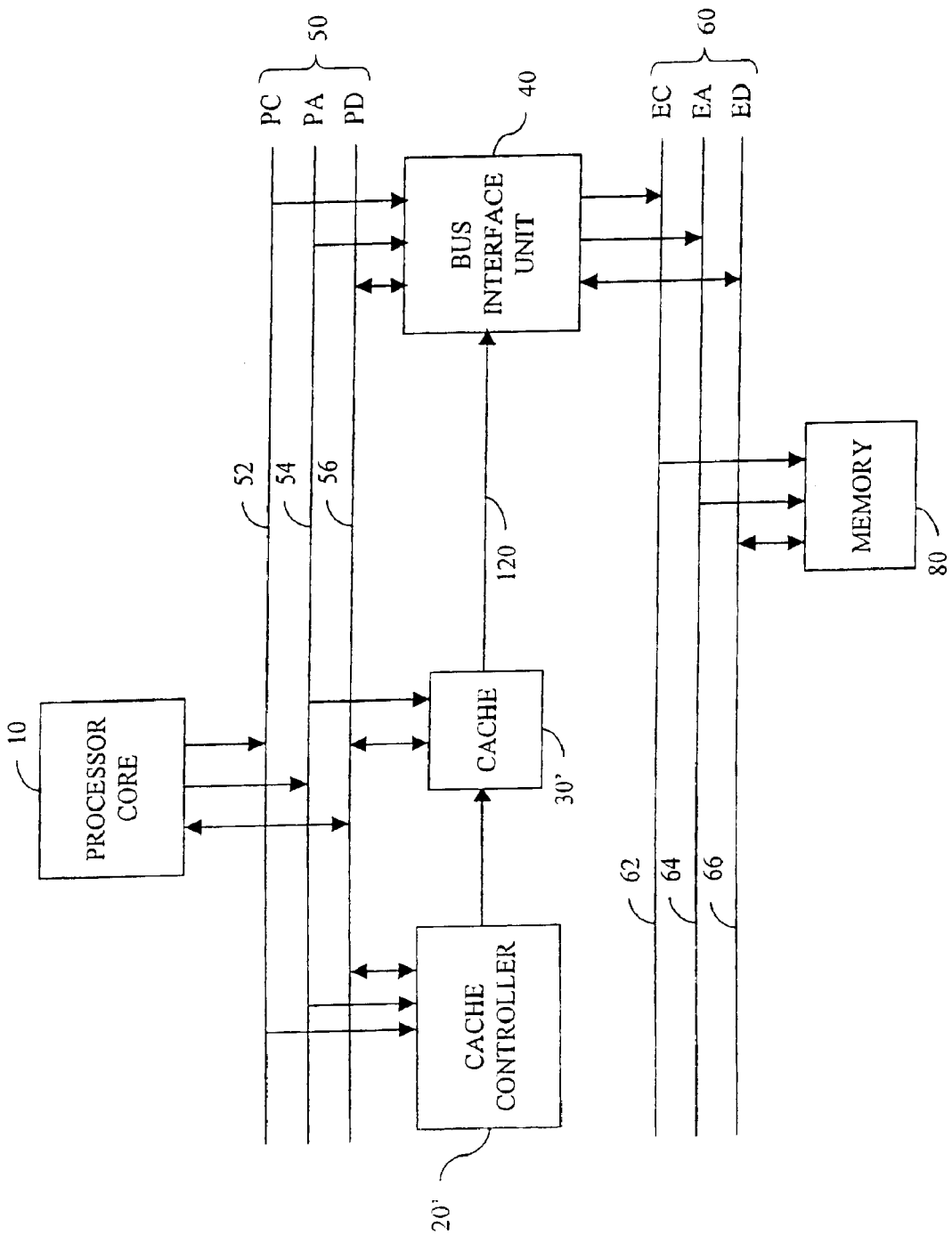
FIG. 3 is a block diagram illustrating a data processing apparatus in which the present invention may be utilised.

Before describing the preferred embodiments of the present invention, in order to aid understanding a general explanation of set associative caches, their operation and arrangement, will be given with reference to FIGS. 3, 4 and 5.

A data processing apparatus incorporating the 4-way set associative cache 30' will be described with reference to the block diagram of FIG. 3. As shown in FIG. 3, the data processing apparatus has a processor core 10 arranged to process instructions received from memory 80. Data values required by the processor core 10 for processing those instructions may also be retrieved from memory 80. The cache 30' is provided for storing data values (which may be data and/or instructions) retrieved from the memory 80 so that they are subsequently readily accessible by the processor core 10. A cache controller 20' controls the storage of data values in the cache 30' and controls the retrieval of the data values from the cache 30'. Whilst it will be appreciated that a data value may be of any appropriate size, for the purposes of the preferred embodiment description it will be assumed that each data value is one word (32 bits) in size.

When the processor core 10 requires to read a data value, it initiates a request by placing an address for the data value on processor address bus 54, and a control signal on control bus 52. The control bus includes information such as whether the request specifies instruction or data, read or write, word, half word or byte. The processor address on bus 54 is received by the cache 30' and compared with the addresses in the cache 30' to determine whether the required data value is stored in the cache 30'. If the data value is stored in the cache 30', then the cache 30' outputs the data value onto the processor data bus 56. If the data value corresponding to the address is not within the cache 30', then the bus interface unit (BIU) 40 is used to retrieve the data value from memory 80.

The BIU 40 will examine the processor control signal on bus 52 to determine whether the request issued by the processor core 10 is a read or write instruction. For a read request, should there be a cache miss (indicated by signal on path 120—e.g. signal "low" indicates a cache miss, signal "high" indicates cache hit), the BIU will initiate a read from memory 80, passing the address from bus 54 onto the external address bus 64. A control signal is placed on bus 62. The memory 80 will determine from the control signal on bus 62 that a memory read is required and will then output on the data bus 66 the data value at the address indicated on address bus 64. The BIU 40 will then pass the data from data bus 66 to the processor data bus 56, where it can be stored in the cache 30' and read by the processor core 10. Subsequently, that data value can readily be accessed directly from the cache 30' by the processor core 10.

The cache 30' typically comprises a number of cache lines, each cache line being arranged to store a plurality of data values. When a data value is retrieved from memory 80 for storage in the cache 30', then in preferred embodiments a number of data values are retrieved from memory in order to fill an entire cache line, this technique often being referred to as a "linefill". In preferred embodiments, such a linefill results from the processor core 10 requesting a cacheable data value that is not currently stored in the cache 30', this invoking the memory read process described earlier. It will be appreciated that in addition to performing linefills on a read miss, linefills can also be performed on a write miss, depending on the allocation policy adopted.

Since a linefill requires the memory 80 to be accessed via the external bus 60, this process is relatively slow, and is governed by the memory speed and the external bus speed.

Figure 4:
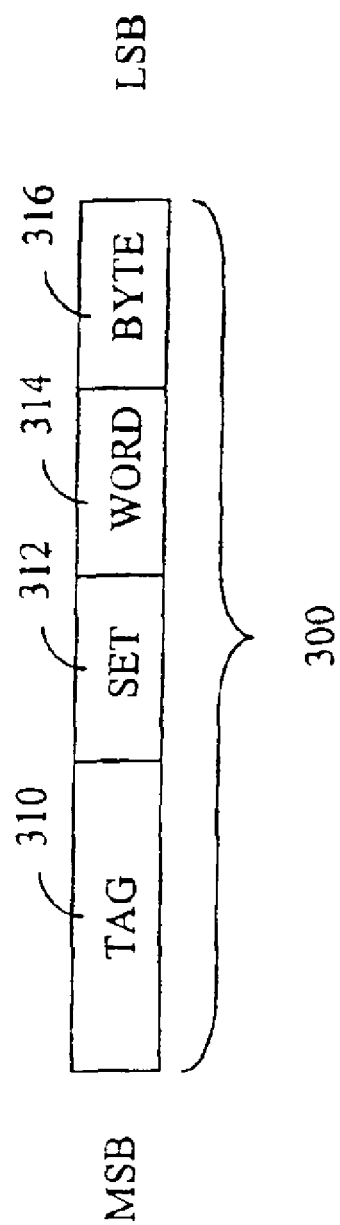
FIG. 4 illustrates the components of an address.

FIG. 4 illustrates the contents of the address 300 output on the processor address bus 54. The address 300 consists of a TAG portion 310, and SET, WORD and BYTE portions 312, 314 and 316, respectively. The SET portion 312 of the address 300 is used to identify a particular set within the cache 30'. The WORD portion 314 identifies a particular word within the cache line that is the subject of the access by the processor core, whilst the BYTE portion 316 allows a particular byte within the word to be specified if required.

Figure 5:
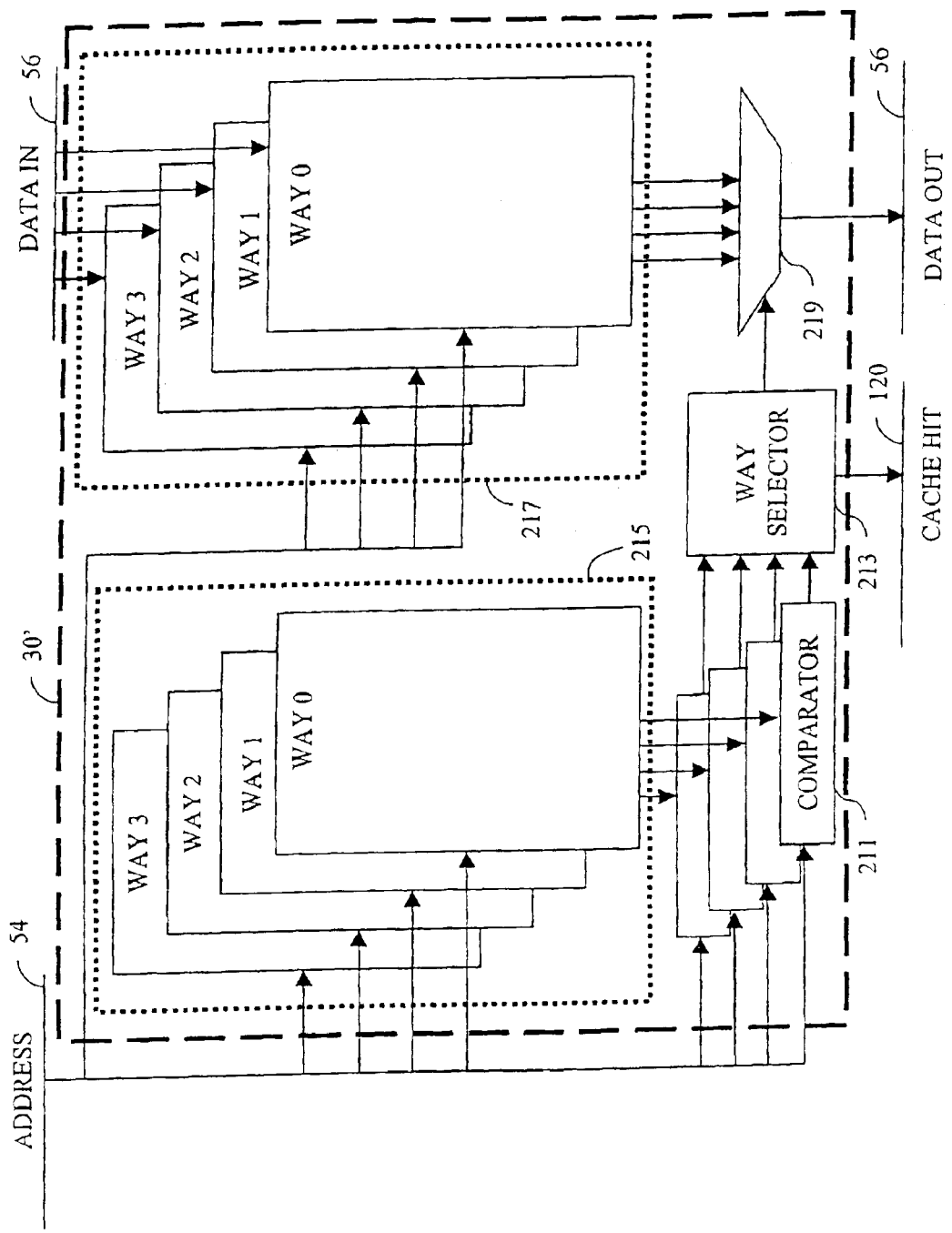
FIG. 5 is a block diagram illustrating accessing the low associative cache.

FIG. 5 illustrates in more detail the operation within the cache 30' when the processor core 10 requests a data value. The cache 30' comprises of four ways, a comparator 211 associated with each way, a way selector 213 and a multiplexer 219.

Each way contains a TAG memory 215 and a data memory 217. The data memory 217 of each way contains a plurality of cache lines that are arranged to store data values. Each set comprises one cache line in each way. Associated with each cache line is an entry in the TAG memory 215 in which a TAG is stored.

When a read is requested, the address 300 for the data value is placed on the processor address bus 54. The address 300 is received by the cache 30' from the processor address bus 54. The TAG memory 215 and data memory 217 in each way receives the address 300. The TAG memory 215 outputs the TAG value stored at the location specified by SET portion 312 of the address 300 to the associated comparator 211. The data memory 217 outputs the data value stored at the location specified by the SET portion 312, WORD portion 314 and BYTE portion 316 of the address 300 to the multiplexer 219. Each comparator 211 then compares the TAG value output from the way with the TAG portion 310 of the address 300 placed on the processor address bus 54.

If the TAG value and TAG portion 310 match then a signal is sent to the way selector 213. The way selector 213 then indicates a cache hit on path 120 and outputs a select signal to multiplexer 219. The multiplexer 219 then selects and outputs the corresponding data value onto the processor data bus 56. Hence, the processor core 10 is provided with the data value directly from the cache 30'.

If the TAG value and TAG portion 310 do not match then no signal is sent to the way selector 213. The way selector 213 then indicates a cache miss by supplying an appropriate signal on path 120 and the data value will be read from memory 80 and stored in the cache 30'. Hence, the processor core 10 is provided with the data value following a delay while it is read from memory 80 and the data value and TAG value are stored in the cache 30' which overwrites a data value and TAG value previously stored in the cache 30'.

However, if the data value overwritten is then required by the processor core 10 for a subsequent operation the access time for the data value becomes unpredictable as the data value must be refetched from the memory 80. This is particularly disadvantageous in real-time systems. Hence, when the access time for a data value needs to be guaranteed it is useful to lockdown these data values in the cache 30'. Preferably, lockdown may be initiated during a bootup routine, where data values for routines such as interrupts or critical runtime routines are locked into the cache 30'. These routines are then available to the processor core 10 from the cache 30' which provides speed benefits. Lockdown can also be invoked at other suitable points during processing.

Figure 6:
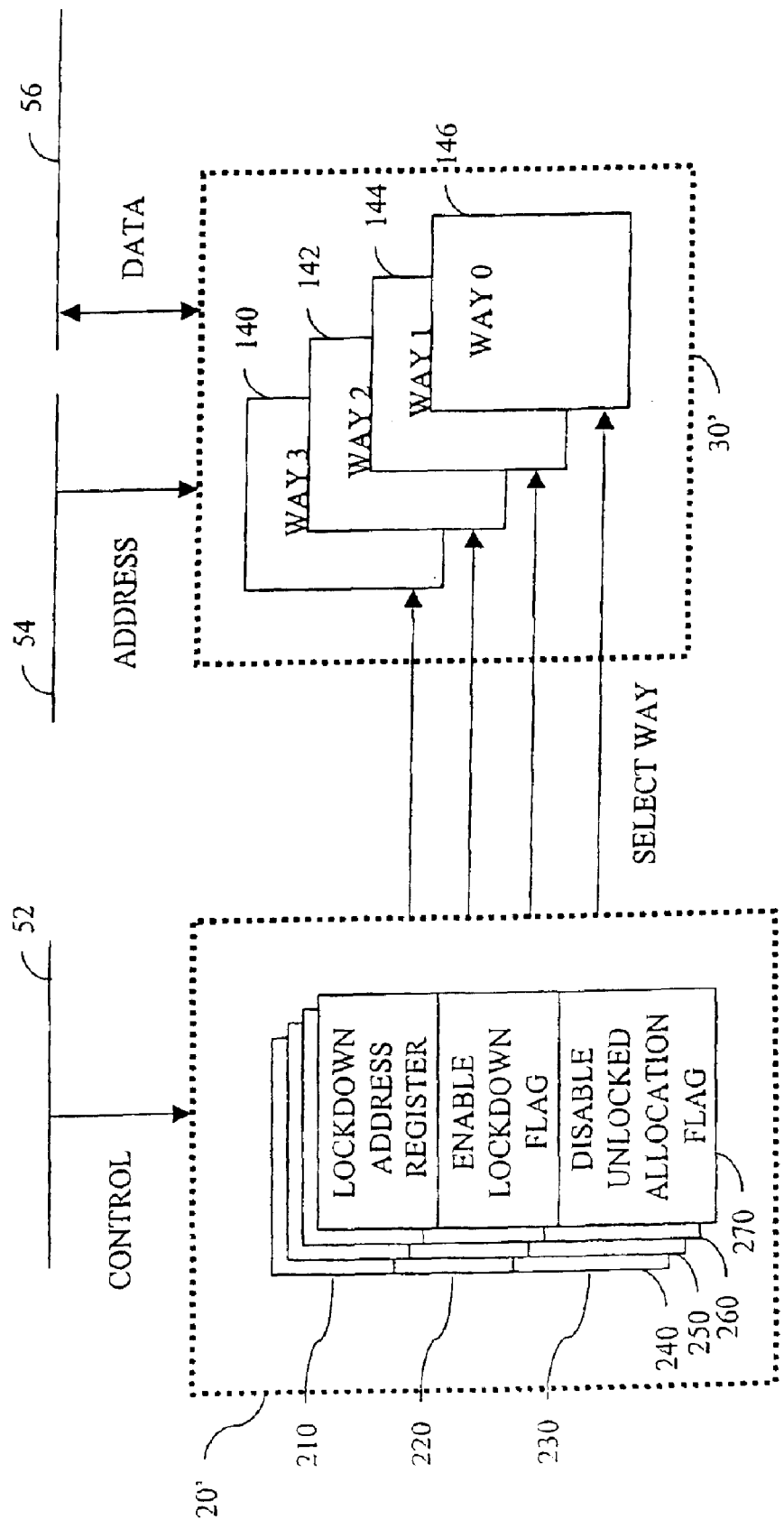
FIG. 6 is a block diagram illustrating the operation of the lockdown controller according to a preferred embodiment.

FIG. 6 illustrates a cache controller 20' for the 4-way set associative cache 30' according to a preferred embodiment of the present invention. The cache controller 20' comprises four lockdown controllers 240, 250, 260, 270, each associated with a corresponding one of the ways of the cache 30'. The functions of the lockdown controllers 240, 250, 260, 270 may be implemented in software or hardware, or a combination of both.

In overview, each lockdown controller 240, 250, 260, 270 is arranged, in a lockdown mode, to lock data values within a specified address range into a corresponding way of the cache 30'.

Each lockdown controller 240, 250, 260, 270 comprises a lockdown address register 210, an enable lockdown flag 220 and a disable unlocked allocation flag 230. Each lockdown controller 240, 250, 260, 270 receives control signals from the processor core 10 over the control bus 52 and outputs a select way signal to a corresponding way of the cache 30'.

The disable unlocked allocation flag 230 is set or cleared by the processor core 10. When the disable unlocked allocation flag 230 is cleared, any data values may be stored in the corresponding way. When the disable unlocked allocation flag 230 is set, only locked data values may be stored in the corresponding way. Preferably, the disable unlocked allocation flag 230 comprises one bit (a logical '1' representing set, a logical '0' cleared) which is arranged to be cleared on initiation.

The lockdown address register 210 is set by the processor core 10. The lockdown address register 210 is arranged to identify an address range specified by the processor core 10, and so for example may explicitly store a lower and upper address thereby defining an address range. However, preferably, the lockdown address register 210 stores an address corresponding to a particular TAG portion of the address 300, the TAG portion being the most significant bits of the address 300, and thereby implicitly specifying an address range.

The enable lockdown flag 220 is set or cleared by the processor core 10. When the enable lockdown flag 220 is set, the lockdown controller operates in the lockdown mode. When the enable lockdown flag 220 is cleared, the lockdown controller operates in an unlocked mode.

The operation of the cache controller 20' will now be explained in more detail. On initiation, the lockdown address register 210, enable lockdown flag 220 and disable unlocked allocation flag 230 are all cleared. Hence, in known manner, any data value may be stored in any way of the cache 30', with existing data values already in the cache 30' being overwritten, in known manner, as and when required.

When lockdown is required, the lockdown controllers may be operated in one of two modes, either "preload and lock" or "background lock".

In the preload and lock mode, the processor core 10 selects and sets the lockdown address register 210 of one of the lockdown controllers with an address range. Thereafter, the disable unlocked allocation flag 230 and enable lockdown flag 220 are set in the same lockdown controller, whilst the disable unlocked allocation flag 230 and enable lockdown flag 220 of the other lockdown controllers remain cleared (unless, of course, data values are already locked in another cache way in which event the disable unlocked allocation flag will be set in that other cache way).

A lockdown program is then executed by the processor core 10 to load the data values to be locked into the cache 30'. Assuming that none of the data values requested are currently stored in the cache 30', the cache 30' will output a cache miss on path 120 and the BIU 40 will fetch the data value from memory 80 as described above. If the address of the data value falls within the address range of the lockdown address register 210 then, when the data value is available on the processor data bus 56, the corresponding way will be selected and the data value stored in that locked way. However, if the address of the data value does not fall within the address range of the lockdown address register 210 then one of the ways with the disable unlocked allocation flag 230 cleared will be selected and the data value stored in that unlocked way. Hence, only data values with an address within the address range will be locked into the locked way, whereas cacheable data values with any other addresses will be locked into one of the unlocked ways. This alleviates the constraints on the way the lockdown program is written, since as long as the data values of the lockdown program are themselves not within the address range, they will not end up locked into the locked way by mistake.

Preferably, once the desired data values have been locked into the cache way, the enable lockdown flag 220 is then cleared to prevent further data values with an address within the address range from overwriting the data values locked in the locked way. Also, whilst locked data remains in the locked way then the disable unlocked allocation flag 230 remains set to prevent any unlocked data from overwriting the locked data.

Hence, in the preload and lock mode according to the preferred embodiment of the present invention only the desired data values will be locked into the locked way of the cache 30' provided the address range is selected such that it does not include any address of the lockdown program. Advantageously, this ensures that the data values of the lockdown program will not occupy the lockdown way and prevent the correct operation of the lockdown program. Hence, the lockdown program need not be specially written such that it will usually operate in uncacheable memory as it will not get locked in the cache 30', and because the lockdown program will not get locked in the cache 30' it is possible for the lockdown program to operate from the cache 30' and achieve speed benefits.

In the background lock mode, the processor core 10 selects and sets the lockdown address register 210 of one of the lockdown controllers with an address range. Thereafter, the disable unlocked allocation flag 230 and enable lockdown flag 220 is set in the same lockdown controller, whilst the disable unlocked allocation flag 230 and enable lockdown flag 220 of the other lockdown controllers remain cleared.

Application code is then executed by the processor core 10. Whenever a data value requested by the processor core 10 is currently not stored in the cache 30', the cache 30' will output a cache miss on path 120 and the BIU 40 will fetch that data value from memory 80 as described above. If the address of the data value falls within the address range of the lockdown address register 210 then, when the data value is available on the processor data bus 56, the corresponding way will be selected and the data value stored in that locked way. However, if the address of the data value does not fall within the address range of the lockdown address register 210 then one of the ways with the disable unlocked allocation flag 230 cleared will be selected and the data value stored in that unlocked way. Hence, only data values with an address within the address range will be locked into the locked way, whereas data values with any other addresses will be locked into one of the unlocked ways.

Preferably, whilst locked data remains in the locked way then the disable unlocked allocation flag 230 remains set.

Hence, the background lock mode according to the preferred embodiment of the present invention does not require a dedicated lockdown program to carefully manage the storage of data values as only data values within the specified address range will be locked into the locked way of the cache 30'. Instead, data values can be automatically stored in a locked way during normal operation of the application code, the choice as to whether any cacheable data value gets locked or not depending on its address.

In either mode, once the lockdown data values are no longer required the disable unlocked allocation flags 230 are cleared. Thereafter, unlocked data values can overwrite locked data values. Also, if a new address range is loaded into the lockdown address register 210 then new locked data can overwrite the no longer required locked data during the lockdown mode. Furthermore, the disable unlocked allocation flags 230 may be set to effectively "reserve" a way for a particular process. This is achieved by only clearing the disable unlocked allocation flag 230 for one way, thereby making the way available for particular processes. This technique is, for example, useful in a multiprocessing environment in situations where it is desirable to temporarily reduce the cache size available. Reducing available cache size may be advantageous in situations where it is known that one of the application programs is particularly inefficient in its use of a cache because it will typically access a data value perhaps only once, whereas another application may be particularly efficient in its use of a cache by accessing a data value many times. Therefore, this technique can be used to ensure that the inefficient application program can only utilise a small portion of the cache.

Whilst four lockdown controllers have been illustrated, it will be appreciated that fewer lockdown controllers could be provided since it may be unnecessary to provide a dedicated lockdown controller for each way. Instead, a selector could be provided to associate a particular way with a lockdown controller. However, it would be necessary in that event to include the disable unlocked allocation flag 230 for each way to indicate whether locked data values are stored in the respective way. Also, it is likely that it would be desirable to have at least one way never designated as locked and hence in this embodiment just three lockdown controllers would be needed.

For the interested reader, a "force mode" will now be described which allows the lockdown controllers to be operated in a similar manner to the prior art approach, thereby allowing reverse compatibility with prior art approaches.

In the force mode, the processor core 10 ensures that a lockdown program is either already loaded into a locked region of the cache 30', or is in an uncacheable region of memory 80. Thereafter, the disable unlocked allocation flag 230 is set in all except one lockdown controller and the enable lockdown flag 230 of all lockdown controllers remain cleared. Hence, only one way will accept any data values (the one whose corresponding lockdown controller has its disable unlocked allocation flag cleared).

The lockdown program is then run which causes data values to be loaded into the one way which will accept any data values.

Once all data values have been loaded, the disable unlocked allocation flag 230 is cleared in all of the lockdown controllers in which it was previously set. Conversely, for the lockdown controller corresponding to the way in which the data values have been loaded, the disable unlocked allocation flag is set to prohibit further unlocked allocation. Hence, all ways except the one way in which the data values have been loaded will accept any data values. The one way in which the data values have been loaded will only accept locked data values. However, because the enable lockdown flag 230 has not been set, the lockdown controller will not lockdown data values as it is not in the lockdown mode. Accordingly, the data values will effectively be locked in that way of the cache 30'.

A further embodiment of the cache will now be described which enables a technique for locking data values on a line-by-line basis.

Before describing the preferred embodiment, in order to aid understanding a general explanation of the detailed arrangement of a cache will be provided.

Figure 7:
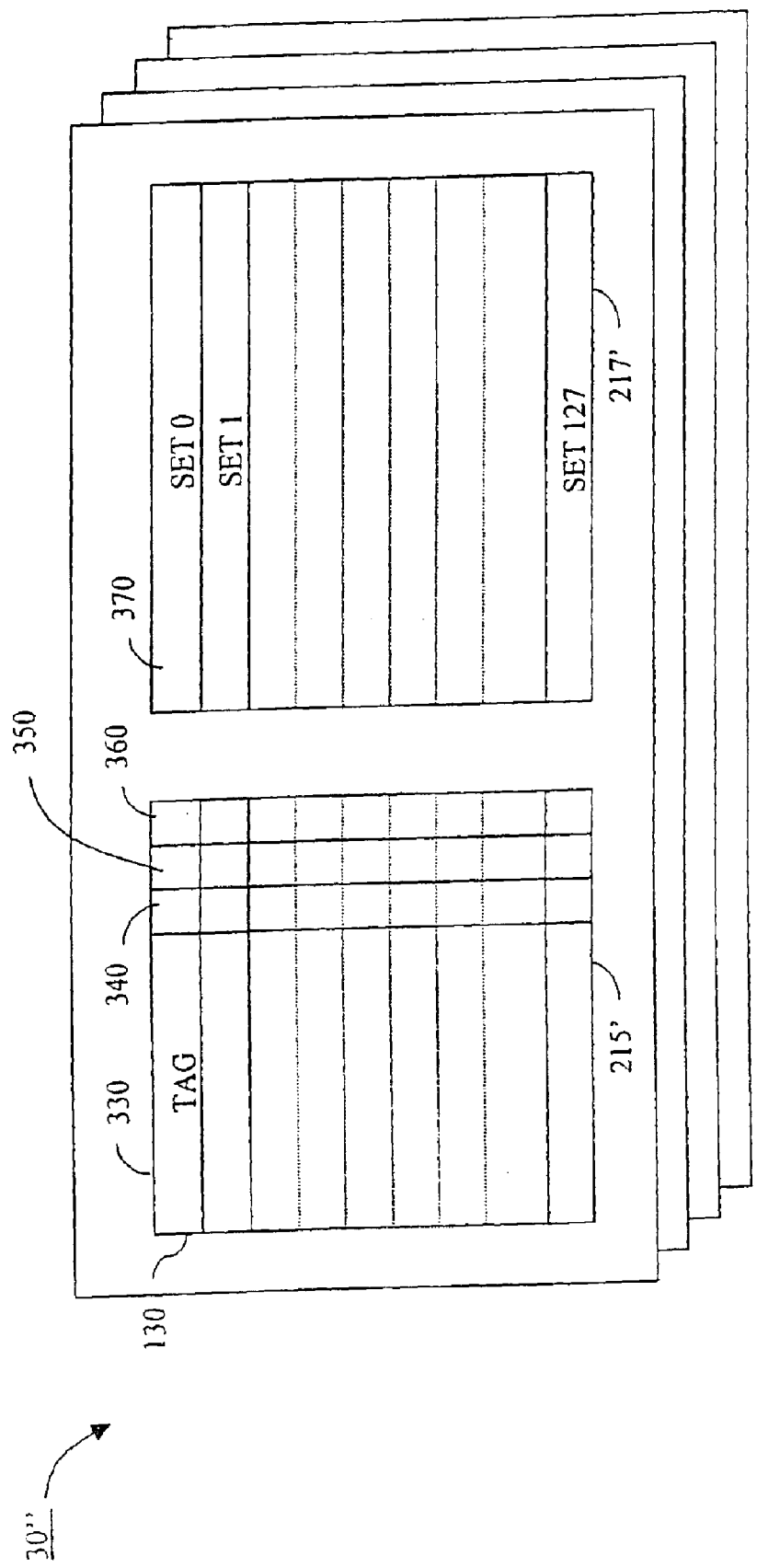
FIG. 7 illustrates the arrangement of the low associative cache according to a preferred embodiment.

FIG. 7 provides a detailed view of way 0 of a cache 30". As mentioned earlier, each entry 330 in the TAG memory 215' has a corresponding cache line 370 in the data memory 217', each cache line containing a plurality of data values. If the TAG portion 310 of an address 300 matches the TAG in one of the TAG entries 330 of the TAG memory 215', then the data value in the corresponding cache line 370 identified by the WORD portion 314 of the address 300 will be output from the cache, assuming the cache line is valid (the marking of the cache lines as valid is discussed below).

In addition to the TAG stored in a TAG entry 330 for each cache line 370, a number of status bits are preferably provided for each cache line. Preferably, these status bits are also provided within the TAG memory 215'. Hence, associated with each cache line, are a valid bit 340 and a dirty bit 350. As will be appreciated by those skilled in the art, the valid bit 340 is used to indicate whether a data value stored in the corresponding cache line is still considered valid or not. Hence, setting the valid bit 340 will indicate that the corresponding data values are valid, whilst resetting the valid bit 340 will indicate that at least one of the data values is no longer valid.

Further, as will be appreciated by those skilled in the art, the dirty bit 350 is used to indicate whether any of the data values stored in the corresponding cache line are more up-to-date than the data value stored in memory 80. The value of the dirty bit 350 is relevant for write back regions of memory 80, where a data value output by the processor core 10 and stored in the cache 30" is not immediately also passed to the memory 80 for storage, but rather the decision as to whether that data value should be passed to memory 80 is taken at the time that the particular cache line is overwritten, or "cleaned", from the cache 30". Accordingly, a dirty bit 250 which is not set will indicate that the data values stored in the corresponding cache line correspond to the data values stored in memory 80, whilst a dirty bit 250 being set will indicate that at least one of the data values stored in the corresponding cache line has been updated, and the updated data value has not yet been passed to the memory 80.

In a typical prior art cache, when the data values in a cache line are overwritten in the cache, they will be output to memory 80 for storage if the valid and dirty bits 340, 350 indicate that the data values are both valid and dirty. If the data values are not valid, or are not dirty, then the data values can be overwritten without the requirement to pass the data values back to memory 80.

In preferred embodiments, a further bit is provided corresponding to each cache line, which will be referred to hereafter as the lockdown bit 360. The lockdown bit 360 is used to lockdown data values on a cache line-by-cache line basis.

On initialization, each lockdown bit 360 is cleared (a logical '0' representing cleared, a logical '1' representing set). When a data value is locked into the cache 30" the associated lockdown bit 360 is set. When a lockdown bit 360 is set, only data values designated to be locked can overwrite the existing locked data value. When a lockdown bit 360 is cleared, any data value can overwrite the existing data value.

Considering the preload and lock, and background lock, modes mentioned above, when utilising the lockdown bit the disable unlocked allocation flag 230 need never be set at all in any of the ways as the lockdown bit 360 will prevent unlocked data values from overwriting locked data values.

The processor core 10 selects and sets the lockdown address register 210 of one of the lockdown controllers with an address range. Thereafter, enable lockdown flag 230 is set in the same lockdown controller, whilst enable lockdown flag 230 of the other lockdown controllers remain cleared. If the address of a data value falls within the address range of the lockdown address register 210 then the corresponding way will be selected, the data value stored in that locked way and the lock bit set. However, if the address of the data value does not fall within the address range of the lockdown address register 210 then one of the other ways may be selected and the data value stored in that unlocked way. Alternatively, if the address of the data value does not fall within the address range of the lockdown address register 210 then the locked way may still be selected, but the data value will be stored in a cache line where the lock bit has not been set, and the lock bit remains cleared.

Hence, only data values with an address within the address range will be locked into the locked way and the lock bit set, whereas, data values with any other addresses will be stored in an unlocked location within the cache 30" and the corresponding lock bit remains cleared.

The lockdown bit 360 will prevent unlocked data values from overwriting locked data values. However, locked data values may overwrite existing locked data values. Once the locked data values are no longer required, the associated lockdown bits 360 will need to be cleared so that the locked data values may be overwritten by any new data values.

Hence, locked and unlocked data values may share the same way of a cache which helps improve cache utilisation. Accordingly, a complete way need not be designated as locked, thus increasing the size of the available cache for unlocked data values. This approach is particularly advantageous for low associative caches, where each way is a significant proportion of the overall cache.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

What is claimed is:

1. A data processing apparatus comprising:

a processor;

an n-way set associative cache having a plurality of entries, where n is an integer greater than 1, each entry being arranged to store one or more data values, the processor being operable to select one of the n-ways to operate in a lockdown mode, the lockdown mode being used to lock data values into the selected one of the n ways; and a plurality of lockdown controllers, each lockdown controller being associated with a corresponding way, each lockdown controller comprising:

a disable unlocked allocation flag, the corresponding way being prevented from storing any unlocked data values when the disable unlocked allocation flag is set;

the processor being operable to set the disable unlocked allocation flag for all of said lockdown controllers other than the lockdown controller associated with said selected one of the n-ways in order to subsequently cause a number of data values for storage in the cache to be stored in that selected one of the n-ways, whereafter the processor is operable to set the disable unlocked allocation flag for the lockdown controller associated with said selected one of the n-ways in order to cause the data values stored in that way to become locked.

2. The data processing apparatus of claim 1 wherein each lockdown controller further comprises an enable lockdown flag, the corresponding way being able to store locked data values when the enable lockdown flag is set, when said number of data values have been stored in the selected one of the n-ways, the associated lockdown controller being arranged to have its disable unlocked allocation flag set whilst its enable lockdown flag is not set, thereby preventing any further data values being allocated to that selected one of the n-ways.

3. The data processing apparatus of claim 1, wherein when said number of data values have been stored in the selected one of the n-ways, all of said lockdown controllers other than the lockdown controller associated with said selected one of the n-ways are arranged to have their disable unlocked allocation flags reset to allow data values to be allocated to the corresponding ways.

4. The data processing apparatus of claim 1 wherein the cache further comprises a lockdown field for each entry which is set to indicate that the one or more data values in that entry are locked.

5. The data processing apparatus of claim 4 wherein each entry comprises a cache line and the lockdown field comprises one bit.

6. A lockdown controller for a data processing apparatus as claimed in claim 1, comprising:

a disable unlocked allocation flag, the corresponding way being prevented from storing any unlocked data values when the disable unlocked allocation flag is set;

the processor being operable to set the disable unlocked allocation flag for all of said lockdown controllers other than the lockdown controller associated with said selected one of the n-ways in order to subsequently cause a number of data values for storage in the cache to be stored in that selected one of the n-ways, whereafter the processor is operable to set the disable unlocked allocation flag for the lockdown controller associated with said selected one of the n-ways in order to cause the data values stored in that way to become locked.

7. A method of locking data values in a way of an n-way set associative cache, where n is an integer greater than 1, the cache having a plurality of entries, each entry being arranged to store one or more data values, the method comprising the steps of:

a) selecting a way from the n ways to operate in a lockdown mode;

b) setting a disable unlocked allocation flag in each lockdown controller associated with the other ways of said n-way set associative cache so that those ways are prevented from storing any unlocked data values;

c) storing a number of data values in said way selected at said step (a); and d) setting the disable unlocked allocation flag in a lockdown controller associated with the way selected at said step (a) to cause the data values stored in that way to become locked.

8. The method of claim 7 further comprising the step of:

at said step (d), ensuring that an enable lockdown flag of said lockdown controller associated with the way selected at said step (a) is not set, thereby preventing any further data values being allocated to that selected one of the n-ways.

9. The method of claim 7, further comprising the step of:

when said number of data values have been stored in the selected one of the n-ways at said step (c), resetting the disable unlocked allocation flags for all of said lockdown controllers other than the lockdown controller associated with said selected one of the n-ways, in order to allow data values to be allocated to the corresponding ways.

\* \* \* \* \*